Dec. 29, 1936. A. A. B. THOMSON ET AL 2,065,990
MECHANISM FOR CARRYING OR RELEASING LOADS FROM AIRCRAFT
Filed March 29, 1934 3 Sheets-Sheet 1
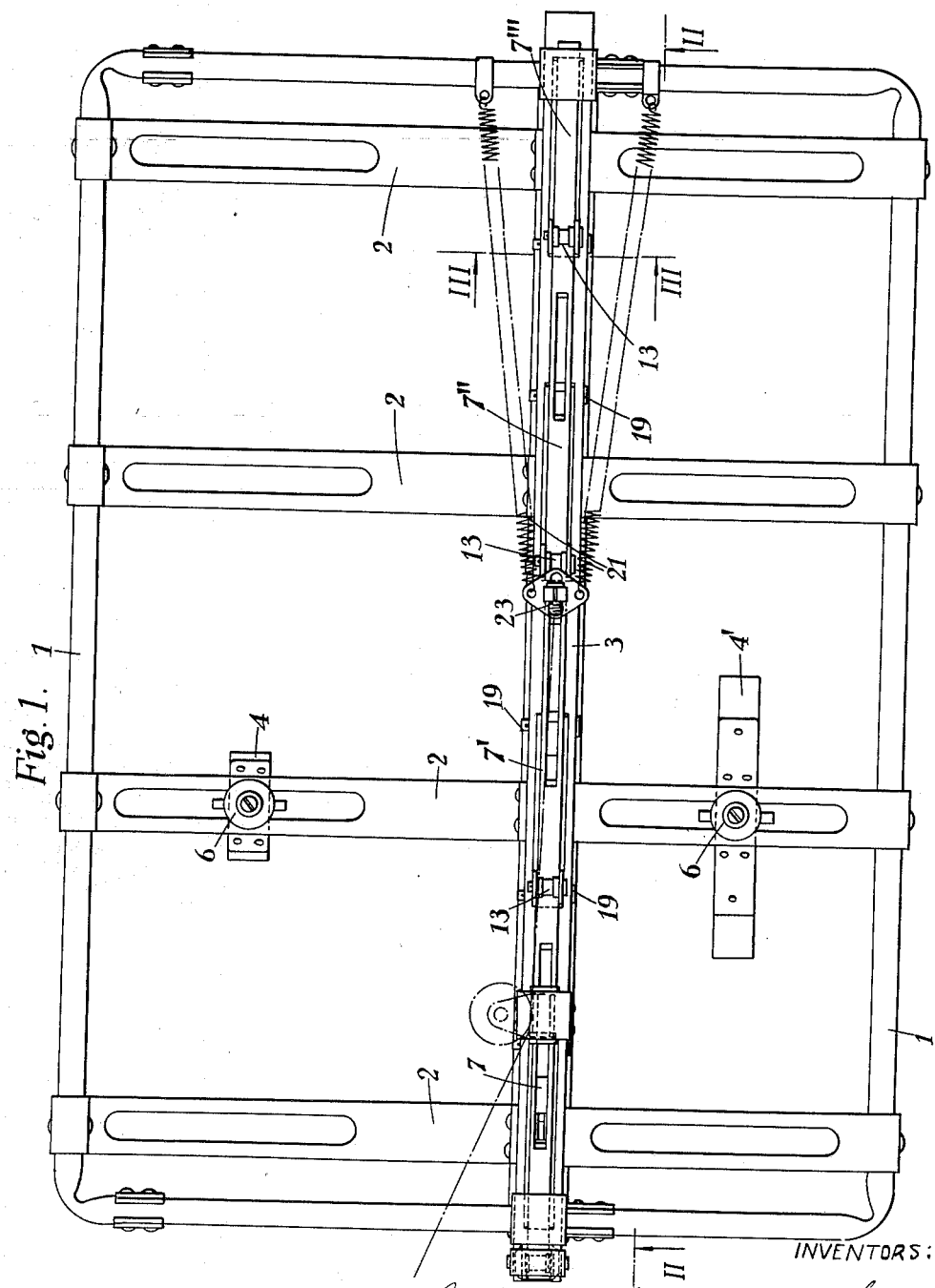
INVENTORS
ATTORNEY

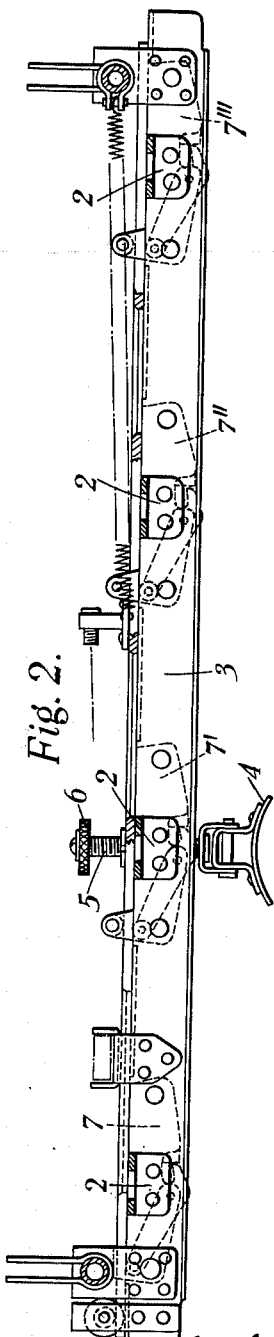

Dec. 29, 1936.  A. A. B. THOMSON ET AL  2,065,990
MECHANISM FOR CARRYING OR RELEASING LOADS FROM AIRCRAFT
Filed March 29, 1934  3 Sheets-Sheet 3
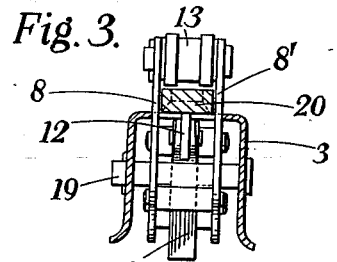
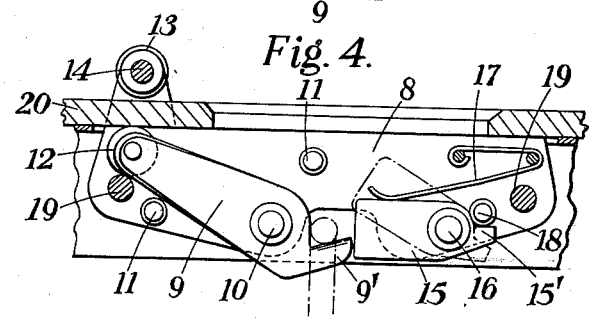
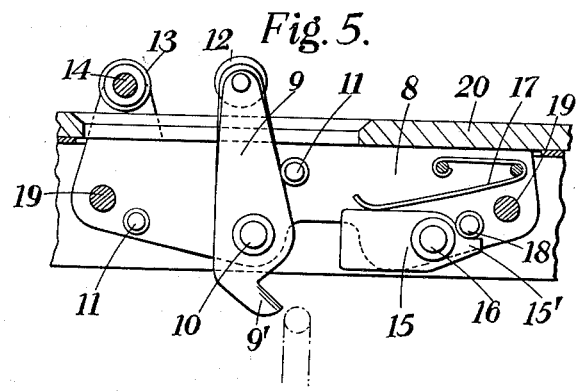
INVENTORS:

Patented Dec. 29, 1936

2,065,990

UNITED STATES PATENT OFFICE 2,065,990

MECHANISM FOR CARRYING OR RELEASING LOADS FROM AIRCRAFT

Arthur Ashford Benjamin Thomson, Winchester, and Geoffrey Haslewood Cooke, London, England Application March 29, 1934, Serial No. 718,004
In Great Britain March 29, 1933

7 Claims. (Cl. 89—1.5)

This invention relates to mechanism for carrying bombs, torpedoes, or other similar loads (hereinafter referred to as "bombs" for brevity) on aircraft and for dropping or releasing them therefrom. The chief object of the invention is to provide mechanism which comprises few moving parts and by means of which the bombs can be securely carried on the aircraft and may yet be easily and readily released from it at will.

In its broad aspect, the mechanism according to the invention comprises a lever adapted to engage and support a bomb and provided with a roller, and a restraining and releasing member in the form of a slidable bar against which the lever roller bears, whereby the lever is constrained to support the bomb but is allowed to pivot and release the bomb when the bar is slid, the bar passing between said lever roller and an abutment for it in the form of a second roller and these two rollers being so disposed as not to tend to tilt or bend the bar appreciably. The bar, which may thus if desired be made comparatively thin, will usually be provided with an opening or a slot through which the lever roller passes when the bar is slid. The bar is moved from the pull-off mechanism on the aircraft. The roller on the lever acts to reduce the friction at the point where the restraining force is a maximum and thus, together with the second roller disposed as aforesaid, facilitates operation of the mechanism. As a result it is not necessary to provide more than one restraining member between the bomb-supporting lever and the pull-off mechanism, that is to say, the bar in the mechanism according to the invention is able to be connected directly to that rod or cable. A number of such levers may be provided and arranged to support a number of bombs, and the same slidable bar may control all these levers in such a way that they may be released singly, in groups, or one after the other in rapid succession. Two or more such levers may be provided for supporting a single bomb at different points and a single bar, or two or more bars (one for each lever) linked together, provided so as to release the levers simultaneously to drop the bomb.

In order that the invention may be clearly understood and readily carried into effect, it will now be described more fully with reference to the examples illustrated in the accompanying drawings. In these drawings:—

Figure 1 is a plan of one form of bomb frame or rack arranged to carry four bombs by means of levers in accordance with the invention;

Figure 2 is a section on the line II—II of Figure 1;

Figure 3 is a detailed section on an enlarged scale on the line III—III of Figure 1; and Figures 4 and 5 are sectional views of units forming part of the arrangement of Figures 1–3.

Referring to the drawings, 1 indicates generally a bomb frame or rack which, in the example illustrated, is rectangular. It is intended to be secured beneath the lower wing or body of an aeroplane. The framework 1 is crossed in a fore-and-aft direction by four spaced cross-members 2, and laterally by an inverted channel member 3. Crutches 4, 4' (of which only one pair is shown) conforming to the shape of the bombs to be used, are mounted on the lower ends of screw-threaded pillars 5 passing through the cross-members 2 and provided with means for securing them to the cross-members. The crutches 4, 4' are adjustable vertically by turning the screw-threaded pillars by means of their milled heads 6; the crutches are also adjustable along the cross-members 2 which are slotted for the purpose. A unit, in which a hook-lever is pivotally carried, is mounted within the channel member 3 at each of the points where the member 3 is met by a fore-and-aft member 2. These units are indicated at 7, 7', 7'', 7'''. Figures 4 and 5 are sections of a unit on a line parallel to the channel member 3. The unit consists of two side plates 8, 8' between which the bomb-supporting lever 9 is arranged. The lever is pivotally carried on a pin 10 which passes through the side plates 8, 8'. One end 9' of the lever is formed as a hook on which the bomb is hung. The other end carries a roller 12. The side plates 8, 8' extend upwards at the same end and a roller 13 is rotatably carried on a pin 14 which passes through the side plate extensions, the axes of the rollers 12 and 13 and the pin 10 being parallel. A catch 15 is also pivotally mounted on a pin 16 between the plates 8, 8' and is urged to turn downwards by a leaf spring 17. It cannot turn below the position illustrated, however, because its tail 15' then abuts against the stop 18. The stop 18 is in the form of a transverse pin and it, and rivets 11, one of which forms a stop for the lever 9, serve to secure together the side plates and to space them apart. The units are secured in position in the channel member 3 by the pins 19 which pass through the vertical walls of this member and through the side plates. The top of the channel member is cut away above each unit so as to allow the side plate extensions with the rollers 13 to project through them to such an extent that a slide bar 20 is able to pass between the top of the channel member and the rollers 13. The slide bar is of such a thickness that the roller 12 clears the roller 13, when the lever 9 pivots about the pin 10. The slide bar 20 is urged against a stop in one direction by the springs 21 and means 23 is provided on it to enable it to be connected by way of a cable or rods to a pull-off device. It will be understood that no moving parts are employed, other than the lever 9, the bar 20, the cable or rods, and such wheels or levers as are necessary for changing the direction of pull in such cable or rods so as to effect connection with the pull-off device of the aircraft. The slide bar 20 has a series of three spaced elongated openings in it.

The bombs are loaded when the slide bar is against its stop. A ring provided on, and approximately over the centre of gravity, of the bomb is pressed up against the bottom of the catch 15 which rises against its spring to allow the bomb ring to pass over the hook 9': the catch then snaps down again. The bomb ring is indicated in dot-and-dash lines. The crutches 4 and 4' are then screwed down on to the bomb to hold it firmly in a fore-and-aft position. The weight of the bomb hanging on the lever 9 causes the roller 12 to be urged upwards against the underside of the portions of the slide bar 20 between the aforesaid openings. The arrangement is such that the roller 12 is now directly beneath the roller 13 so that the slide bar 20 is merely gripped between these two rollers which do not tend to bend it. When the pull-off device is moved, the slide bar is drawn from right to left. The openings are so spaced that the left-hand opening in the slide bar 20 comes above the roller 12 of the unit 7 before the other openings, or the right-hand end of the bar, pass over the rollers of the other units. The roller 12 rises through the opening, the hook 9' falls and the bomb ring slips off it so that the bomb falls. On further movement of the slide bar 20, a space comes above the roller 12 of unit 7', then the third space comes over the unit 7'' and finally the end of the bar passes over and releases the roller of the last unit 7''' so that the four bombs fall one after the other. After the bombs are released the levers 9 fall back against their stops 11. Naturally the bombs may be released one at a time by moving the slidable bar 20 in steps; or in as rapid succession as desired by a single complete movement of the bar. Naturally if all the levers are to be released at one time, the slots would be so arranged in the bar that, when the bar is moved, all the slots would come above the levers simultaneously. It will be seen that the fulcrums of the levers 9 are considerably nearer the hooks 9' than are the rollers 12 so that the pressure of the rollers on the slide bar is only a small proportion of the bomb weight, and as the rollers 12 and 13 are arranged so as not to tend to tilt or bend the slide bar, the latter can be moved easily, being opposed merely by the friction of the rollers under pressure. Moreover, the solid portions of the bar between the spaces are sufficiently long to allow for possible stretch or other unforeseen variation in length in the cable or other means by which the bar is moved from the pull-off device.

Especially when heavy bombs are to be carried, the arrangement may be such that the bomb is hung on the lever 9 at a point vertically or nearly vertically over the fulcrum 10 when the lever is restrained, and a spring provided to give the lever a slight initial movement, after which it is turned further due to the weight of the bomb until the bomb is released.

It is to be understood that the construction described above is merely given by way of example and may be modified without departing from the scope of the invention and therefore the claims are intended to be construed to cover all such modifications as their language will allow in the light of the prior art. Thus, although the arrangement described is found to be convenient, it is not necessary to employ a number of units received in an inverted U-channel member. The fulcrums of all the levers could extend between and be supported by two spaced members like the walls of the channel member so that no individual units would then be employed. Moreover, the arrangement need not necessarily be such that the lever rollers bear against the under side of the slidable bar. They could bear on the top of it. Nor need the levers lie wholly beneath the bar as illustrated; for although the rollers should always be mounted on the levers so that their axes are at right angles to the direction of movement of the bar, the levers may be arranged at any desired angle to the bar, the rollers then being mounted on the levers at the appropriate angle. Thus, the levers could extend at right angles to the bar when the axis of the lever roller would lie longitudinally of the lever.

It will, in general, be desirable to arrange the fulcrum of the bomb supporting lever relatively near to the hook and relatively far from the roller so that the thrust on the roller end is as small as may be. It will be clear, however, that the bomb hook need not necessarily be at one end of the lever nor need the fulcrum be between the hook and the roller; thus, the hook could be between the fulcrum and the roller. It is not absolutely necessary to provide the lever with a hook for supporting the bomb, for the bomb could be supported on the end of a plain lever over which the bomb ring would be placed. If such an arrangement is adapted, it is advisable to provide a fixed stop for the bomb-supporting end of the lever, this stop being so formed as to imprison the bomb ring between it and the end of the lever and prevent it sliding off prematurely. When such a stop is employed, the spring-loading latch, as described with reference to Figures 1–5, may be combined with it in order to make it unnecessary to manipulate the sliding bar 20 during loading.

When a slotted bar is employed in conjunction with a number of levers, it is not, of course, necessary to provide as many slots as there are levers, one fewer being sufficient because the end of the bar may be allowed to release an end lever.

It is to be understood that the claims are not limited to the constructions shown in the drawings since clearly modifications may be made, and therefore the claims are intended to be construed to cover all such modifications as their language will allow in the light of the prior art.

We claim:—

1. Bomb carrying and releasing mechanism comprising a lever adapted to support a bomb and provided with a roller, and a restraining and releasing member in the form of a slidable bar against which said lever roller bears whereby the lever is constrained to support the bomb but is allowed to pivot and release the bomb when said bar is slid, said bar passing between said lever roller and an abutment for said bar in the form of a second roller and these two rollers being so disposed as not to tend to tilt or bend said bar appreciably.

2. Bomb carrying and releasing mechanism comprising two or more levers each adapted to support a bomb and each provided with a roller, and a restraining and releasing member in the form of a single slotted slidable bar against which each of said lever rollers bears whereby the levers are constrained to support the bombs while each is allowed to pivot and release its bomb when said bar is slid to bring a slot opposite the roller, said bar passing between said lever rollers and a second set of rollers forming abutments for it, the rollers being so disposed as not to tend to tilt or bend said bar appreciably.

3. Bomb carrying and releasing mechanism comprising two or more levers each provided with a roller and adapted to support the same bomb at different points and a single restraining and releasing member in the form of a slotted slidable bar against which said lever rollers bear whereby the levers are constrained to support the bomb while they are allowed to pivot simultaneously and release the bomb when said bar is slid, said bar passing between the lever rollers and other rollers forming abutments for it and the rollers being so disposed as not to tend to tilt or bend said bar appreciably.

4. Mechanism for carrying bombs on an aircraft and releasing them therefrom, comprising a frame adapted to be secured to the aircraft and including a pair of spaced members pivotally supporting between them two or more levers each adapted to support a bomb and each provided with a roller, a slidable bar having an opening or openings therein against which bar said rollers bear, said bar being slidable between said lever rollers and rollers mounted on said frame, these rollers being so disposed as not to tend to tilt or bend the bar appreciably, and means for sliding said bar so that an opening passes opposite each of said levers to allow it to pivot and release the bomb.

5. Bomb carrying and releasing mechanism comprising a lever adapted to support a bomb and provided with a roller, and a restraining and releasing member in the form of a slidable bar against the underside of which said lever roller bears whereby the lever is constrained to support the bomb but is allowed to pivot and release the bomb when said bar is slid, said bar passing between said lever roller and an abutment for said bar in the form of a second roller and these two rollers being so disposed as not to tend to tilt or bend said bar appreciably.

6. Bomb carrying and releasing mechanism according to claim 1 wherein said lever roller is arranged at one end of said lever and the lever is adapted to support the bomb at the other end, the fulcrum of the lever being nearer the bomb supporting end.

7. A unit for use in bomb carrying and releasing mechanism comprising two side plates spaced apart, a lever between the plates, a pin extending between the plates on which said lever is pivoted, the said lever being adapted to engage and support a bomb, a roller mounted on the said lever, a roller mounted between the said plates parallel to the aforesaid roller, a restraining and releasing member comprising a slidable bar between the aforesaid rollers, the relation of the said rollers to the said slidable bar being such as to restrain the appreciable tilting or bending of the said bar.

ARTHUR ASHFORD
BENJAMIN THOMSON.
GEOFFREY HASLEWOOD COOKE.